Figure 1:
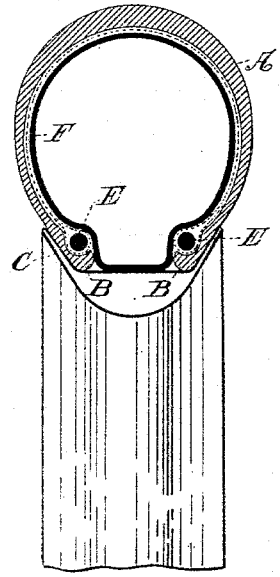

(No Model.)

J. G. A. KITCHEN.
PNEUMATIC TIRE.

No. 531,951. Patented Jan. 1, 1895.

Witnesses.
C. M. Werle
Hubert Peck

Inventor.
J. G. A. Kitchen
per O. E. Duff
Attorney

UNITED STATES PATENT OFFICE.

JOHN GEORGE AULSEBROOK KITCHEN, OF ARDWICK, ENGLAND.

PNEUMATIC TIRE.

SPECIFICATION forming part of Letters Patent No. 531,951, dated January 1, 1895.

Application filed December 18, 1893. Serial No. 493,930. (No model.) Patented in England October 30, 1893, No. 20,495, and in France December 7, 1893, No. 234,619.

*To all whom it may concern:*

Be it known that I, JOHN GEORGE AULSEBROOK KITCHEN, a subject of the Queen of Great Britain and Ireland, residing at Ardwick, near Manchester, in the county of Lancaster, England, have invented Improvements in Pneumatic Tires, (for which I have obtained Letters Patent in Great Britain, No. 20,495, dated October 30, 1893, and in France, No. 234,619, dated December 7, 1893,) of which the following is a specification.

This invention of improvements in or relating to pneumatic tires has for its object to provide simple means for effectually securing the outer covering or casings of pneumatic tires to wheel rims in such a manner that when the tires are deflated they can be quickly removed and replaced but cannot be forced out of position while in use.

Hitherto the coverings of detachable pneumatic tires have usually been secured to wheel rims of special section by a wire ring or rings partly or wholly incased in the folded edges of the tire covering, the said wires being each surrounded by an equal thickness of the material of which the covering is formed and held in position against the sides but not against the bottom of the groove in the wheel rim by the inflated air tube, the ring being held at some little distance from the bottom of the groove in consequence of the wire ring being of such a size that it can be worked over the wheel rim. The wire rings are therefore free to shift when the air tube is wholly or partially deflated which allows one portion of the ring to rest against the bottom of the wheel rim, thus causing the opposite side to become slack and move outwardly, when it is liable to spring off the wheel, there being nothing to hold the wires in position when the air tube is deflated.

Now according to my invention instead of the usual wire or wires I provide in an encircling endless hoop or ring of non-corrosive material within each of the folded over or tubular edges of the inner canvas lining of the outer cover and form the rubber casing with thickened edges the arrangement being such that when the tire is in position on the wheel rim the thickened rubber parts of the outer cover will lie between the encircling hoop and the bottom of the wheel rim against the flanged sides of which it will rest and that part of the hoop or ring against which the inflating tube presses will be covered with a layer of canvas only. Thus to remove the tire the side of the covering is pressed inward until the canvas covered part of the encircling hoop or ring is turned over so as to rest for a portion of the periphery of the wheel rim against the bottom thereof thus leaving the opposite part of the hoop or ring sufficiently slack to be capable of being drawn over the flange.

Figure 2:
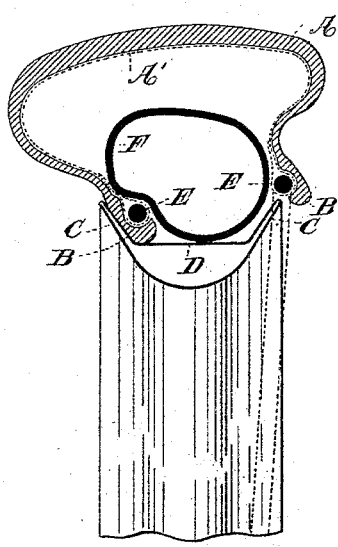
Figure 3:
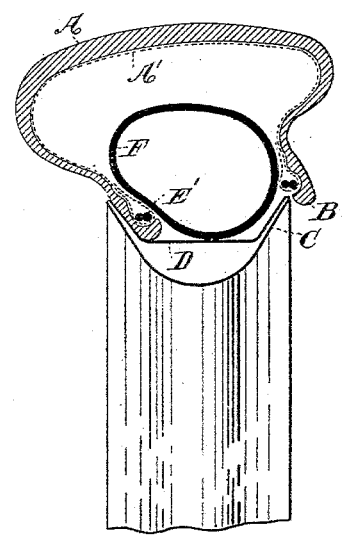
Figure 3:
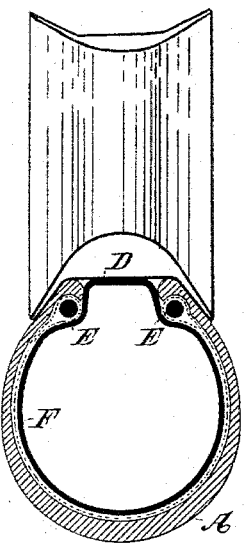
Figure 3:
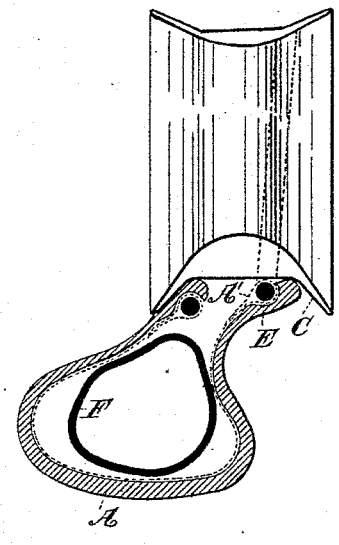
Figure 3:
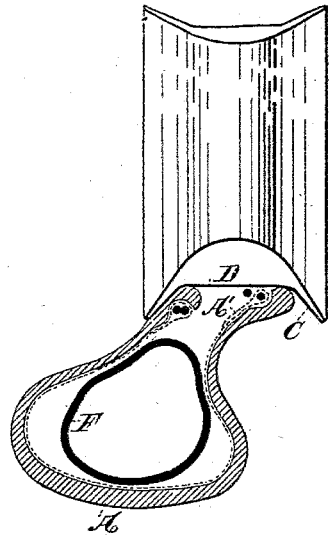

In the accompanying sheet of drawings, Figure 1, is a cross section showing a cycle wheel rim with a detachable tire according to this invention inflated; Fig. 2, a similar view with the air tube deflated and one of the encircling hoops in its normal position and the other one turned to allow of its removal from the wheel rim; Fig. 3, a similar view showing a double wire encircling hoop.

The center portion of the cycle wheel rim is broken away in each figure.

Similar letters refer to like parts throughout the drawings.

The outer cover of the tire comprises a rubber casing A with thickened edges B, B, so shaped that when in position the thickened edges rest against the flanged sides C and on the bottom D of the wheel rim, and a canvas lining A' within the folded over or tubular edges of which are loosely arranged encircling hoops E of cane Figs. 1 and 2, or of non-corrosive wire which may be double Fig. 3. The thickened rubber edges B, B, project beyond the tubular edges of the canvas lining the arrangement being such that when the tire is in position upon the wheel rim, they fill up the space between the smallest diameter of the encircling hoops E and the bottom D of the wheel rim as shown in Fig. 1. The thickened edges B of the rubber outer casing A are so formed that when the tire is deflated the sides of the cover may be pressed inward toward each other until the thickened edges B are partly turned about the encircling hoop E. There is then between each hoop E and the bottom of the wheel rim D only the thin layer of canvas which allows of one portion of each hoop resting practically on the bottom of the wheel rim as shown to the right hand in the lower portion of Figs. 2 and 3, which admits of the opposite portion of the hoop being drawn over the flange C, of the wheel rim as shown to the right hand in the upper portions Figs. 2 and 3. The outer cover can thus be taken off to admit of inspection or repairs to the air tube F, or the like. It will thus be understood that the thickened edges B of the outer rubber casing A, form a kind of cam rotated on the encircling hoop E, such that when in position, i. e., forcing outward or holding up and retaining the hoop concentric with the wheel rim and about midway between the top and bottom edges of the flanged sides of the rim C it is impossible to draw off the tire without first curving the sides inward as above described which cannot be done while the tire is in use.

The encircling hoop or ring is in some cases formed of a cane E, brought to a uniform diameter by drawing through dies and the ends securely spliced together in any suitable manner. It is placed upon the canvas lining of the outer cover and the edge thereof is turned over and cemented so as to form a tubular edge to the lining within which the cane is free.

In attaching tires according to this invention the cane hoop E may be replaced by a double ring of non-corrosive wire E' as shown in Fig. 3, the two ends of which project outside the canvas sufficiently to allow of their ends being permanently secured together.

What I claim is—

1. A pneumatic tire having an outer cover provided with thickened cam-shaped longitudinal edges as described each adapted to support an endless retaining ring concentric with and at a short distance from the bottom of the groove in a wheel rim substantially as herein described.

2. A pneumatic tire having the cam-shaped, longitudinal thickened edges adapted to bear against the sides and bottom of the groove in a wheel rim, and each provided on its inner side with an endless retaining ring arranged concentric with and at a short distance from the free end of the corresponding thickened edge so that either of said edges can be rocked inwardly, and thereby move the ring inwardly and loosen the tire, substantially as described.

3. A pneumatic tire cover having a longitudinal rockable edge provided with encircling clamping means arranged so that said edge can be rocked to move the encircling clamping means toward or from the rim and thereby loosen the clamping means, or tighten the same and lock the tire on the rim, substantially as described.

4. A pneumatic tire cover having a non-extensible clamping ring, and provided with a rockable longitudinal edge in the rim between the rim and said ring and arranged to rock in one direction to tighten the ring to clamp the tire, or to rock in the opposite direction to loosen the ring and tire, substantially as described.

5. A pneumatic tire having an outer cover formed with the rockable thickened edges adapted to rest against the bottom of the groove in a wheel rim, a lining formed with tubular edges secured to said thickened edges above the free ends thereof, and retaining rings arranged within said tubular edges, said thickened edges being each adapted to be partly turned over on the corresponding retaining ring as a center, substantially as described for the purpose specified.

6. A pneumatic tire provided with an outer cover having thickened edges and thin lining provided with tubular edges, partly located within grooves on the inner sides of said thickened edges, and retaining rings of material, such as cane or wire, located within the tubular edges of said lining and of such a diameter that they cannot become detached from the wheel rim while the thickened edges of the cover rest against the bottom of the groove in said rim whether the tire be inflated or not, substantially as herein described.

7. The combination with a wheel rim of a pneumatic tire comprising an air tube, an outer cover having thickened edges each formed with an annular groove arranged at a short distance from its free edge, and retaining rings held in said grooves concentric with the wheel rim and projecting inwardly from the inner sides of said thickened edges substantially as herein described for the purpose specified.

In testimony whereof I have signed my name to this specification in the presence of two subscribing witnesses.

JOHN GEORGE AULSEBROOK KITCHEN.

Witnesses:
 JAMES WOODS,
10 *Rosina St., Ashton Old Rd., Fairfield, Manchester.*
 F. M. C. SCOTT,
89 *Victoria Street, Liverpool.*